(12) United States Patent
Garabedian

(10) Patent No.: US 6,512,727 B2
(45) Date of Patent: Jan. 28, 2003

(54) TALKING STRAW WITH GUIDE RIDGE

(76) Inventor: Marcus Garabedian, 2540 Denise, Orange, CA (US) 92667

(*) Notice: Subject to any disclaimer, the term of this patent is extended or adjusted under 35 U.S.C. 154(b) by 0 days.

(21) Appl. No.: 10/010,228

(22) Filed: Dec. 7, 2001

(65) Prior Publication Data

US 2002/0041559 A1 Apr. 11, 2002

Related U.S. Application Data

(63) Continuation of application No. 09/218,935, filed on Dec. 22, 1998, now abandoned.

(51) Int. Cl.$^7$ .................................................. A63H 1/28

(52) U.S. Cl. .................................................. 369/63

(58) Field of Search .................... 369/63, 68; 138/121, 138/178; 239/33, 211; 215/388; 220/712

(56) References Cited

U.S. PATENT DOCUMENTS

| | | | | |
|---|---|---|---|---|
| 3,398,624 A | * | 8/1968 | Stoessel | 239/33 |
| 3,780,944 A | | 12/1973 | Zubalik | 239/33 |
| 4,121,835 A | | 10/1978 | Garabedian | 369/68 |
| 4,379,511 A | | 4/1983 | del Fabro | 215/388 |
| 4,502,608 A | | 3/1985 | Mills | 220/712 |
| 4,631,715 A | | 12/1986 | Hoover | 369/68 |
| 4,726,518 A | | 2/1988 | Martina et al. | 239/33 |
| D317,543 S | | 6/1991 | Small | D7/300.2 |
| 5,427,316 A | | 6/1995 | Leone | 239/33 |
| 5,806,765 A | | 9/1998 | Weinstein | 239/33 |
| 6,129,292 A | * | 10/2000 | Leung et al. | 239/211 |
| 6,296,926 B1 | * | 10/2001 | Huebner | 369/68 |

* cited by examiner

Primary Examiner—Hoa T. Nguyen
Assistant Examiner—Tianjie Chen
(74) Attorney, Agent, or Firm—Stetina Brunda Garred & Brucker

(57) ABSTRACT

An improved sound producing elongate member of the type that comprises a sound track thereon, the improvement wherein a ridge extends longitudinally on the surface thereof and the sound track is formed in said ridge.

14 Claims, 1 Drawing Sheet

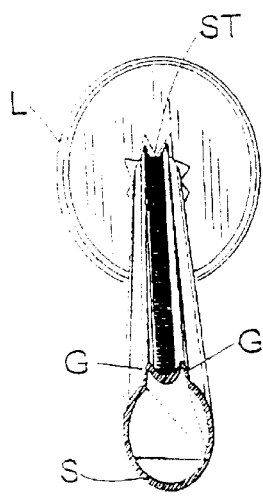
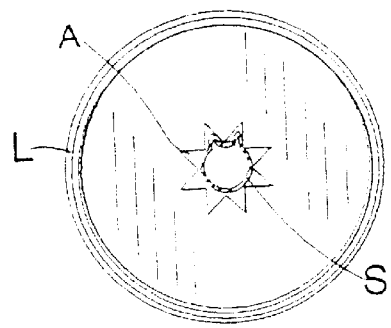
FIGURE 1
FIGURE 2
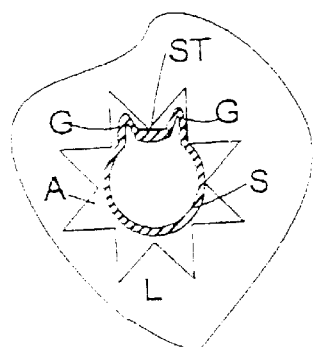
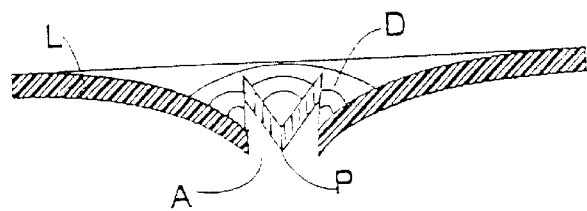
FIGURE 3
FIGURE 4

TALKING STRAW WITH GUIDE RIDGE

This is a continuation of application Ser. No. 09/218,935, filed on Dec. 22, 1998, now abandoned.

FIELD OF THE INVENTION

This invention relates generally to sound producing devices. These devices may be in the form of toys, signaling devices, or other products. In one embodiment, which is used for illustrating the invention, the invention is embodied in a "talking straw," i.e., a drinking straw and a drink cap.

BACKGROUND OF THE INVENTION

This is an improvement of the talking straw disclosed and claimed in my father's patent, U.S. Pat. No. 4,121,835, George V. Garabedian. The talking straw disclosed in the aforesaid patent is an elongate thin walled annulus, i.e., a typical drinking straw, with the added feature of a sound track formed longitudinally in one wall of the annulus. In this prior art patent, the straw's sound track is in the form of lateral ribs pressed into a generally flat portion that constitutes a secant of the otherwise circular annular configuration of the wall of the straw. As such, the sound track is not well exposed. As a result, it is difficult to cause the sound track to contact the aperture of the Lid. This inhibits the reliable production of a clear and audible message.

It is an object of this invention to overcome the aforesaid problem and, in addition, to make the reliable production of higher quality sound easier and more certain.

SUMMARY OF THE INVENTION

My invention is a sound producing system, the preferred embodiment of which is a "talking straw" that has a raised ridge linearly along the side of the device. The sound track, in the form of undulations or ridges is embossed on the external surface of the raised ridge. This positions the sound track for being contacted with the aperture in the lid, or other semi-rigid structure that is capable of being vibrated in the audible frequency range. The lid, or other semi-rigid structure that is capable of being vibrated in the audible frequency range, forms an aperture having at least one projection, and preferably a plurality of evenly spaced projections. In one form, the lid, or other semi-rigid structure that is capable of being vibrated in the audible frequency range, defines a twelve-pointed star-shaped aperture with inwardly directed points. The projections may terminate in a point or a radiused projection the outline of which may be described as an arch in which the legs converge to make a point to form an apex or top of the arch These projections, whatever the configuration, are referred to in general as points. The raised ridge and sound track are more easily and more certainly contacted with a point of the aperture and a higher quality sound than that produced by the prior art device is more reliably produced upon relative longitudinal movement of the elongate sound track carrier and the points in the aperture. In the straw and lid, which is the preferred embodiment, the straw and lid are moved relative to each other with the sound track in contact with the point in the aperture in the lid.

The raised ridge and the relationship of the points allow for the device to work well in a wider spectrum of climates and enables the device to produce sound when frozen material is combined with liquids in the container. The invention enables sound production by the invention during the occurrence of expansion and contraction and with the use of a greater range of materials of variable pliability of which the elongate device or aperture forming structure, e.g., the lid, or other semi-rigid structure that is capable of being vibrated in the audio frequency range, may be formed.

Another feature of the invention is the provision of one, and preferably two, guides. A guide is provided on one or both sides of the sound track. The guide is formed as part of the raised ridge and may result from the depression of the center part of the ridge by the embossing of the sound track, the edges of the ridge remaining substantially fully raised. The guide, or guides, engage a point adjacent one or both sides of the point that is contacted with the sound track as the elongate device, i.e., the sound producing point, e.g., talking straw, tends to turn. The tendency to turn, i.e., rotate about the longitudinal axis of the straw, is thus counteracted and the sound track tends to remain in contact with the sound producing point formed in the aperture in the lid.

The aperture is preferably formed in a dimple, i.e., a depression, which, in turn, is formed in the Lid, or other semirigid structure that is capable of being vibrated in the audible range. The dimple in the Lid, or other semi-rigid structure that is capable of being vibrated in the audible frequency range, creates an angle of contact enabling the plurality of resilient points or arches to track the straw more uniformly. The shoulders bordering the sound track perform the function of guiding the sound track on a straight path so that only one of the plurality of resilient points or arches contact the sound track during the relative movement between the sound track of the elongated member and the lid, or other semi-rigid structure that is capable of being vibrated in the audible frequency range, whose aperture exposes formed or precut points.

The invention in a preferred form is a system for the production of sound by the relative movement between an elongated member in contact with a projection in an aperture. The elongated member has a prerecorded sound track in the form of lateral ribs or undulations on the raised external surface ridge. Preferably, the raised ridge also forms a guide ridge on each side of the sound track The raised ridge with the sound track embossed thereon spans at least a portion of the elongate member, and preferably spans the entire length of the elongate member. The aperture is, in a preferred embodiment, formed in a lid for drinks such as are used at fast food stores. The lid has an aperture defining points, the term points including arches, so constructed and configured as to come in contact with the prerecorded sound track when the elongate member is inserted in the aperture and moved longitudinally.

Other features, and advantages of the present invention are stated in or are apparent from the detailed description of a presently preferred embodiment of the invention found herein below.

BRIEF DESCRIPTION OF THE DRAWINGS

FIG. 1 depicts the preferred form of the invention comprising a drinking straw having a ridge formed along the length of one side, a sound track embossed in the center of the ridge, with guide ridges on each side of the sound track, the straw extending through an aperture in a lid for drinks.

FIG. 2 depicts the lid with the straw extending through an aperture therein, the sound track being in contact with a point formed in the aperture and the guide ridges guiding the sound track into contact with the point.

FIG. 3 is an enlarged view of the aperture and straw as depicted in FIG. 3 showing the contact of the sound track with the point in the aperture more clearly.

FIG. 4 is a cross-sectional view of the portion of the lid that has the aperture formed therein showing the dimple or depression in which the aperture is preferable formed.

DESCRIPTION OF THE PREFERRED EMBODIMENT

The preferred embodiment is depicted in FIG. 1 wherein the elongated member having a prerecorded sound track is a drinking straw. The prerecorded sound track is in the form of ribs or undulations on the raised external surface of the straw. As the straw is inserted through the aperture of the lid, or other semi-rigid structure that is capable of being vibrated in the audible range, the sound track can be made to contact one of a number of formed or precut points, which may be in the form of arches. Upon relative longitudinal movement of the straw and the lid, with the sound track structure of the straw in contact with the point, the aperture forming structure, e.g., the lid, which is a semi-rigid, large surface area sheet, which may be dome, generally planar or in another configuration, the sound track causes the lid to vibrate and create audible sound vibrations thereby "playing" the sound track on the straw.

While a drinking straw and lid are the presently preferred embodiment of the invention, the elongate sound producing member need not be a straw, and any semi-rigid sheet material having an aperture formed therein, the aperture forming one or more points, may be used The invention may, for example, be in the form of a bird or animal call wherein a stick or rod having the sound track arrangement described is moved through an aperture in a sound producing speaker. In one preferred class of embodiments, the invention may be embodied in any or all of a great many sound producing toys, as well as in signaling devices and in other products.

Referring now to the figures, the straw S is shown extending through an aperture a in a lid L with the sound track ST engaging a point P formed in the aperture a in the lid L. The sound track ST is guided by a pair of guide ridges G on the respective sides of the sound track.

Making particular reference to FIG. 4, in the preferred embodiment, the aperture a is formed in a dimple or depression D in the lid L. This permits direct contact of the sound track ST with the point P on one side of the semi-ridged sheet or film stock of which the lid L is formed.

The elongate sound producing device may be made of a great variety of materials of variable pliability. Such materials include paper, e.g., waxed or waterproofed paper, polyethylene, cellulose esters, polyvinyl acetate, poly(vinyl acetate-vinyl chloride) copolymers, polystyrene and most polymer materials. The lid may, likewise, be made of the same materials a fairly stiff polymer, e.g., cellulose polymers, polyvinyl acetate, poly(vinyl acetate-vinyl chloride) copolymers, polystyrene or polystyrene can be formed into a very suitable lid.

So formed, the sound producing system of the present invention in the preferred form as a talking straw can be used with varying temperatures of liquids including liquids combined with frozen materials.

The raised ridge in which the sound track is formed allows the engraved or embossed audio sound track to come in contact with one of the points or arches defined by the aperture. Unlike the prior art, the raised sound track shown in allows the lid's aperture to be slightly larger, reducing the direct pressure placed against the surrounding points or arches. The other points or arches of the aperture collectively cause less friction and permits more free acoustic vibration of the sheet or film of which the lid, or other semi-rigid structure that is capable of being vibrated in the audible frequency range, is formed. This results in less noise and produces a clearer, less distorted audio message.

The lid is preferably detachable fitted to the opening of a drink container, or other support, forming,.in effect, a drum head. The lid, or other semi-rigid acoustic sound generating device, has formed therein an aperture having a plurality of points or arches lining the aperture's inner circumference. In the preferred form of the invention, the aperture is recessed at the base of an indentation, referred to as a dimple. The dimple causes the points or arches to protrude in a direction less than parallel with the lid. The created angle produces clearer reproduction of the prerecorded sound track in the form of ridges or undulations on the raised surface of an elongated member as the points or arches lining the aperture make contact during the relative movement of the raised sound track of the elongated member and the plurality of resilient points or arches lining the inner dimensions of the lid's aperture.

During the sound embossing of the sound track to the top of the raised ridge spanning the length of the elongated member the sound track will be recessed into the raised ridge of the elongated member. The sound track's width is less than the width of the raised ridge and along the top of the straw's ridge two shoulders are now created. The two shoulders act as guide ridges and aid in the tracking of the elongated member's sound track during the relative movement between the elongated member and the points or arches lining the aperture of the lid.

In the aforementioned prior art, a crease must be made along the side of the sound track which exposes the sound track The sound track can be played but it tends to slip slightly from the optimum point as it is played through the aperture. The guide ridges prevent such slippage. The guide ridges guide the raised sound track of the elongated member in a straight path during the relative movement of the elongated member and the point or arches lining the inner circumference of the aperture of the lid. The guide ridges aid in the alignment and aid in maintenance of the path of the sound track of the elongated member during the relative movement between the elongated member having a raised prerecorded sound track and the plurality of points or arches lining the inner circumference of the lid's aperture causing a point or arch to vibrate the lid, resulting in the reproduction of the sound track The guide ridges directly aid in the centering and maintaining that relationship during the relative movement of the elongated member and a point or arch lining the inner circumference of the lid's aperture, resulting in a consistently clear message.

The aperture of the lid is placed at the base of a dimple of the lid. The opening is circled by a plurality of points or arches. Eight such points are illustrated for simplicity of illustration, however, twelve points are preferred More or fewer points may be used but the optimum number of points (arches) is believed to be between six and twelve. The distance between the summits on each point and the width of the sound track are so configured and dimensioned as to allow only one point or arch to play the sound track It will be appreciated that the invention may be made in many forms so long as the functional structures described are retained. It will also be appreciated that the invention may be made using many materials, some of which are mentioned. Those skilled in the art can readily select suitable materials using as a starting point conventional drinking straw and drink lid sheet materials.

INDUSTRIAL APPLICATION

This invention finds application in many audible sound producing businesses and particular application in the paper and plastic converting industry.

What is claimed is:

1. An improved sound producing drinking system of the type that comprises an elongate sound producing member having a sound track thereon and a semi-rigid sheet material having an aperture formed therein defining points extending inwardly from the edges of the aperture, the improvement wherein: the sound producing member defines a ridge extending longitudinally on the surface thereof and wherein the sound track comprises ribs lateral to and formed in said ridge, such that sound is produced by direct contact between the sound track and a region of the aperture during relative longitudinal movement between the sound producing member and the semi-rigid sheet material, and the ridge further comprises at least one guide ridge thereon extending longitudinally adjacently and parallel to the sound track.

2. The improved sound producing drinking system of claim 1 comprising a pair of guide tracks on the ridge extending longitudinally adjacently and parallel to the sound track on the respective sides thereof.

3. The improved sound producing drinking system of claim 2 wherein the aperture is formed in a dimple in the semi-rigid sheet material.

4. The improved sound producing drinking system of claim 3 wherein the semi-rigid sheet material is a drink lid and the sound producing member is a drinking straw.

5. The improved sound producing drinking system of claim 1, wherein the aperture is formed in a dimple in the semi-rigid sheet material.

6. The improved sound producing drinking system of claim 5 wherein the semi-rigid sheet material is a drink lid and the sound producing member is a drinking straw.

7. The improved sound producing drinking system of claim 1, wherein the semi-rigid sheet material is a drink lid and the sound producing member is a drinking straw.

8. An improved sound producing drinking straw of the type that comprises a sound track thereon, the improvement wherein: the drinking straw is so constructed and configured as to define a ridge extending longitudinally on the surface thereof and wherein the sound track comprises ribs lateral to and formed in said ridge, and said ridge further comprises at least one guide ridge thereon extending longitudinally adjacently and parallel to the sound track on the respective sides thereof.

9. An improved sound producing drinking straw of the type that comprises a sound track thereon, the improvement wherein: the drinking straw is so constructed and configured as to define a ridge extending longitudinally on the surface thereof and wherein the sound track comprises ribs lateral to and formed in said ridge, and said ridge further comprises a pair of guide tracks thereon extending longitudinally adjacently and parallel to the sound track on the respective sides thereof.

10. A sound producing toy comprising an elongate sound producing member having a sound track thereon and a semi-rigid sheet material having an aperture formed therein defining points extending inwardly from the edges of the apertures, the sound producing member being so constructed and configured as to define a ridge extending longitudinally on the surface thereof and wherein the sound track comprises ribs lateral to and formed in said ridge, wherein the ridge guides the sound track to contact with only a region of the aperture for producing sound.

11. The toy of claim 10 wherein the sound producing member further comprises at least one guide ridge on the ridge extending longitudinally adjacent and parallel to the sound tracks.

12. The toy of claim 11 wherein the sound producing member comprises a pair of guide tracks on the ridge extending longitudinally adjacent and parallel to the sound on the respective sides thereof.

13. The toy of claim 12 wherein the aperture is formed in a dimple in the semi-rigid sheet material.

14. The toy of claim 10 wherein the aperture is formed in a dimple in the semi-rigid sheet material.

* * * * *